June 13, 1939. W. J. SMITH 2,162,183
FOOT CONTROL
Filed Nov. 12, 1936 2 Sheets-Sheet 1

Inventor
William J. Smith

By Clarence A. O'Brien
Hyman Berman
Attorneys

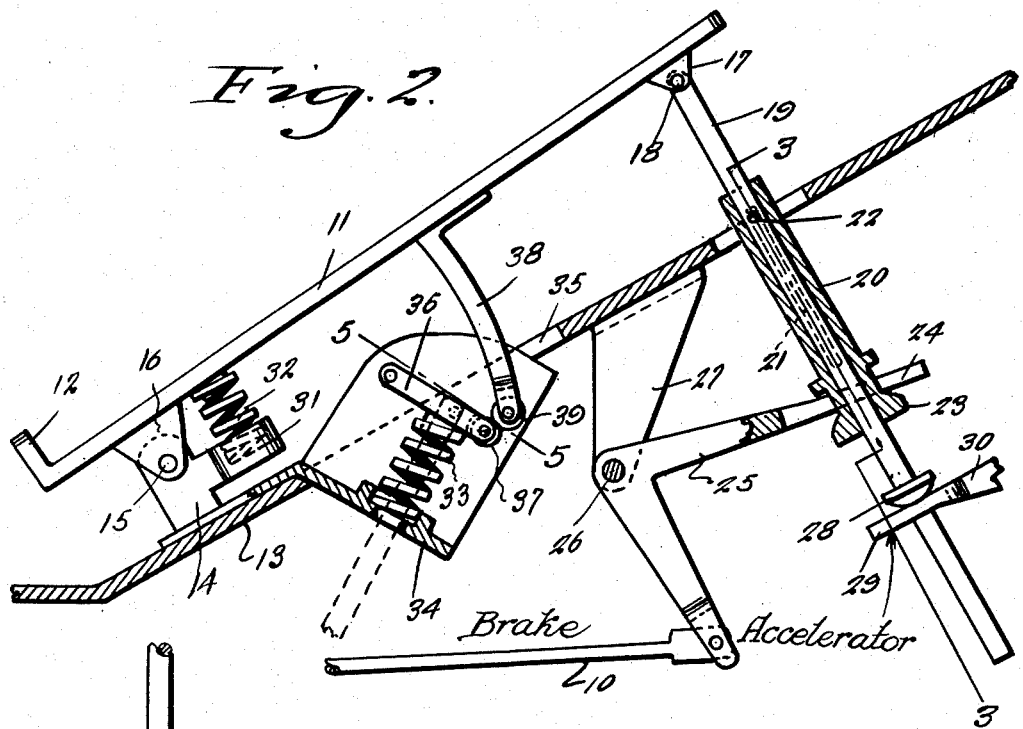
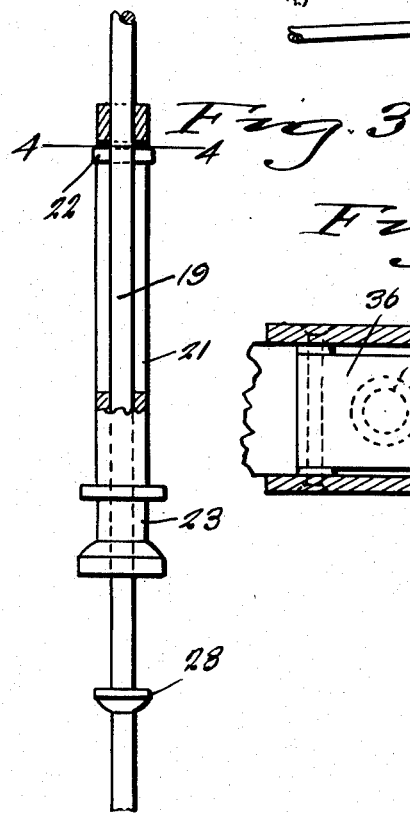
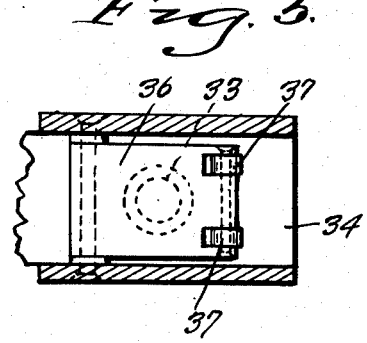
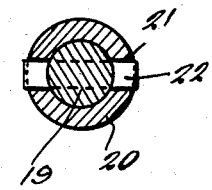

Patented June 13, 1939

2,162,183

UNITED STATES PATENT OFFICE 2,162,183

FOOT CONTROL

William J. Smith, Delaware City, Del.

Application November 12, 1936, Serial No. 110,544

12 Claims. (Cl. 192—3)

This invention appertains to new and useful improvements in foot controls and more particularly whereby the brakes and accelerator of a motor vehicle can be controlled from a single foot pedal.

An important object of the present invention is to provide a novel foot pedal control for motor vehicles whereby the usual accelerator and brakes of the vehicle can be efficiently controlled by operating the pedal in different directions.

Another important object of the invention is to provide a single foot control pedal whereby the usual accelerator and brakes of a motor vehicle can be operated by operating the pedal in an upward or downward direction.

Another important object of the invention is to provide a control of the character stated wherein the parts are of simple construction and not susceptible to the ready development of defects.

Still another important object of the invention is to provide a foot pedal control for accelerators and brakes wherein a motor starting switch can be incorporated so that the pedal can be used for either starting, accelerating or braking the vehicle.

Other important objects and advantages of the invention will become apparent to the reader of the following specification.

In the drawings:

Figure 2 is a vertical sectional view through the pedal control shown in Figure 1.

Figure 3 is an enlarged sectional view taken substantially on the line 3—3 of Figure 2.

Figure 4 is a section on the line 4—4 of Figure 3.

Figure 5 is a fragmentary detailed sectional view on the line 5—5 of Figure 2.

Figure 1:
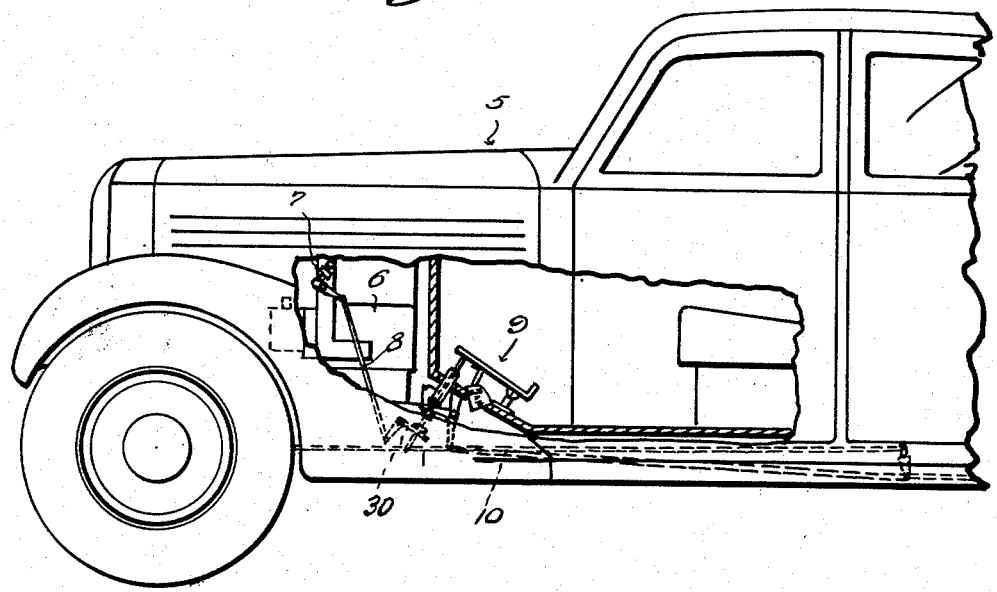
Figure 1 represents a side elevational view of the forward portion of a motor vehicle showing the novel pedal control installed.
Figure 6:
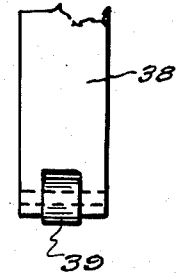
Figure 6 is a fragmentary elevational view of the roller carrying arm of the pedal.
Figure 7:
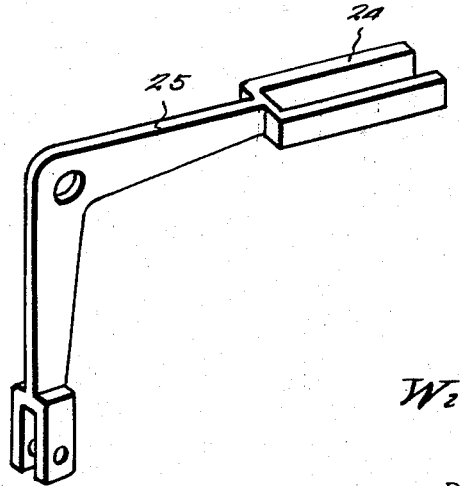
Figure 7 is a perspective view of the bell crank shown in Figure 2.

Referring to the drawings wherein like numerals designate like parts, it can be seen in Figure 1 that the numeral 5 generally refers to a conventional motor vehicle having the usual motor 6. Numeral 7 represents the accelerator control and numeral 8 represents the rod extending thereto.

Numeral 9 generally refers to the novel pedal for both operating the accelerator rod 8 and the brakes through the brake rod 10.

Figure 2 shows in detail the preferred form of the invention which consists of the foot pedal 11 having the upstanding heel plate 12. Numeral 13 is the usual toe board of the floor from which rises the post 14 which is pivotally connected as at 15 to the depending ears 16 on the rear end of the pedal 11. Depending ears 17 on the forward end of the pedal 11 pivotally connect as at 18 to the upper end of the rod 19 which extends downwardly through the barrel 20. The barrel 20 is provided with slots 21 therein and a pin 22 extends through the rod 19 and slots 21 in the barrel 20. A circumferentially grooved head 23 is provided at the lower end of the barrel 20 and is engaged by the yoke end 24 of the bell crank 25 which is pivotally supported as at 26 by the bracket 27. The opposite end of the bell crank 25 has the brake rod 10 connected thereto. The lower end of the rod 19 is provided with a head 28 which engages the slotted end 29 of the accelerator rod operating bell crank 30. (See Figure 1.)

A socket member 31 extends forwardly from the post 14 and a coiled compressible spring 32 is interposed between this socket structure 31 and the bottom side of the pedal 11.

It can now be seen, that the spring tends to normally urge the pedal 11 in an upward direction and this is assisted by the spring 33 which is interposed between the inclined plate 34 depending through the opening 35 in the toe board 13 and the pivotal arm 36 which as shown in Figure 5 is provided with a pair of spaced rollers 37—37 at its free end.

The pedal 11 is provided with a depending leg 38 having a roller 39 at its lower end. The rear surface of the leg 38 being on an arc of a circle having the first point 15 of the pedal 11 as its center.

It can be seen that when the pedal 11 is depressed to accelerate the motor of the vehicle, the roller 39 of the leg 38 will ride off the arm 36 and in this position, the spring 33 will offer no force against the pedal 11 thus allowing the driver to operate the pedal against only the force of the spring 32. Thus it can be seen, that as the rod 19 is urged downwardly depressing the accelerator bell crank 30, the barrel 20 remains stationary on the yoke 34. However, when the pedal 11 is released the spring 32 will elevate the pedal and as the roller 39 engages the arm 36 the spring 33 will commence to exert force against the same thus forcing the pedal upwardly under the force of both springs 32—33 resulting in the pin 22 engaging the upper end of the slot 21 and lifting the barrel 20 and consequently pulling upwardly on the yoke 24 so as to impart a pull on the brake rod 18.

Having described the invention what is claimed as new is:

1. In combination a foot pedal, an accelerator control, a brake control, means rockably supporting the pedal and connections between the pedal and the said controls, and means for urging the pedal in a direction operating the said brake control, said spring means consisting of a pair of springs exerting force against the pedal and means for relieving the pedal of one of the springs when the pedal is actuated in a direction to operate the accelerator control.

2. A double-acting foot pedal comprising a pedal, a spring associated with the pedal to urge the pedal in one direction, and a second spring associated with the pedal to increase the total force exerted by the springs during a portion of the movement of the pedal, said pedal being provided with an arcuate leg against the free end of which the second mentioned spring exerts force during a portion of the travel of the pedal, said second mentioned spring being disposed on a line substantially chordal with respect to the circle on which the arcuate leg travels when the pedal moves, to allow the second spring to ride against the leg when the pedal is moved against the force of the first mentioned spring.

3. A double-acting foot pedal comprising a pedal, a spring associated with the pedal to urge the pedal in one direction, and a second spring associated with the pedal to increase the total force exerted by the springs during a portion of the movement of the pedal, said pedal being provided with an arcuate leg against the free end of which the second mentioned spring exerts force during a portion of the travel of the pedal, said second mentioned spring being disposed on a line substantially chordal with respect to the circle on which the arcuate leg travels when the pedal moves, to allow the second spring to ride against the leg when the pedal is moved against the force of the first mentioned spring, and anti-frictional means between the second mentioned spring and the arcuate leg.

4. A double-acting foot pedal comprising a pedal, a spring associated with the pedal to urge the pedal in one direction, and a second spring associated with the pedal to increase the total force exerted by the springs during a portion of the movement of the pedal, said pedal provided with an arcuate leg against the free end of which the second mentioned spring exerts force during a portion of the travel of the pedal, said second mentioned spring being disposed on a line disposed in a chordal position with respect to the circle on which the arcuate leg travels when the pedal is moved, a pivotal arm against which the second mentioned spring exerts force, and an anti-frictional element mounted on the free end of the arm for riding engagement with the arcuate leg.

5. A double-acting foot pedal comprising a pedal, a spring associated with the pedal to urge the pedal in one direction, and a second spring associated with the pedal to increase the total force exerted by the springs during a portion of the movement of the pedal, said pedal provided with an arcuate leg against the free end of which the second mentioned spring exerts force during a portion of the travel of the pedal, said second mentioned spring being disposed on a line disposed in a chordal position with respect to the circle on which the arcuate leg travels when the pedal is moved, an arm against which the second mentioned spring exerts force, and an anti-frictional element mounted on the free end of the arm for riding engagement with the arcuate leg, the free end of the arcuate leg being provided with anti-frictional means for riding engagement over the free end portion of the arm.

6. A double-acting foot pedal comprising a pedal, a spring associated with the pedal to urge the pedal in one direction, and a second spring associated with the pedal to increase the total force exerted by the springs during a portion of the movement of the pedal, said pedal being provided with an arcuate leg against the free end of which the second mentioned spring exerts force during a portion of the travel of the pedal, said second mentioned spring being disposed on a line substantially chordal with respect to the circle on which the arcuate leg travels when the pedal moves, to allow the second spring to ride against the leg when the pedal is moved against the force of the first mentioned spring, an accelerator control line, a brake control line including a yoke, a rod pivotally connected at one end to the pedal and having a T-formation at its opposite end bridging the yoke and a pivotal connection between the rod at its T-formation end and the accelerator line through the said yoke.

7. A foot pedal of the character described comprising a movably mounted plate, a spring adapted to urge the plate in one direction, a second spring cooperative with the plate to increase the total force exerted by the springs during a portion of the movement of the plate, said plate provided with a depending member against a portion of which the second-mentioned spring is adapted to exert force during a portion of the travel of the plate.

8. A foot pedal of the character described comprising a movably mounted plate, a spring adapted to urge the plate in one direction, a second spring cooperative with the plate to increase the total force exerted by the springs during a portion of the movement of the plate, said plate provided with a depending member against a portion of which the second-mentioned spring is adapted to exert force during a portion of the travel of the plate, said depending member being constructed and arranged to relieve the plate of the force of the second-mentioned spring when the plate and depending member are depressed.

9. A foot pedal of the character described comprising a movably mounted plate, a spring adapted to urge the plate in one direction, a second spring cooperative with the plate to increase the total force exerted by the springs during a portion of the movement of the plate, said plate provided with a depending member against a portion of which the second-mentioned spring is adapted to exert force during a portion of the travel of the plate, and anti-frictional means between the depending member and the second-mentioned spring.

10. A foot pedal of the character described comprising a movably mounted plate, a spring adapted to urge the plate in one direction, a second spring cooperative with the plate to increase the total force exerted by the springs during a portion of the movement of the plate, said plate provided with a depending member against a portion of which the second-mentioned spring is adapted to exert force during a portion of the travel of the plate, and a pivotal arm interposed between the depending member and the second-mentioned spring, said arm having its free end portion in riding engagement with the depending member.

11. A foot pedal of the character described comprising a movably mounted plate, a spring adapted to urge the plate in one direction, a second spring cooperative with the plate to increase the total force exerted by the springs during a portion of the movement of the plate, said plate provided with a depending member against a portion of which the second-mentioned spring is adapted to exert force during a portion of the travel of the plate, and a pivotal arm interposed between the depending member and the second-mentioned spring, said arm having its free end portion in riding engagement with the depending member, and anti-frictional means between the depending member and the said pivotal arm.

12. A foot pedal of the character described comprising a movably mounted plate, a spring adapted to urge the plate in one direction, a second spring cooperative with the plate to increase the total force exerted by the springs during a portion of the movement of the plate, said plate provided with a depending member against a portion of which the second-mentioned spring is adapted to exert force during a portion of the travel of the plate, an accelerator control line, a brake control line including a yoke, a rod pivotally at one end to the pedal and having a T-formation at its opposite end bridging the yoke and a pivotal connection between the rod at its T-formation end and the accelerator line to the said yoke.

WILLIAM J. SMITH.